(12) United States Patent
Xu et al.

(10) Patent No.: US 9,435,409 B2
(45) Date of Patent: Sep. 6, 2016

(54) VARIATOR OUTPUT GEARSET

(75) Inventors: Hai Xu, Northville, MI (US); Avinash Singh, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 13/301,159

(22) Filed: Nov. 21, 2011

(65) Prior Publication Data

US 2013/0130863 A1    May 23, 2013

(51) Int. Cl.
| | |
|---|---|
| *F16H 15/38* | (2006.01) |
| *F16H 55/12* | (2006.01) |
| *F16H 55/17* | (2006.01) |
| *F16H 55/34* | (2006.01) |

(52) U.S. Cl.
CPC ............. *F16H 15/38* (2013.01); *F16H 55/12* (2013.01); *F16H 55/17* (2013.01); *F16H 55/34* (2013.01)

(58) Field of Classification Search
CPC ........ F16H 15/38; F16H 55/12; F16H 55/17; F16H 55/34
USPC .................. 74/1, 10, 40–42, 46, 70
See application file for complete search history.

(56) References Cited

U.S. PATENT DOCUMENTS

| | | | | |
|---|---|---|---|---|
| 4,805,161 | A * | 2/1989 | Kroner ........................ | 368/220 |
| 6,063,002 | A * | 5/2000 | Nobumoto et al. ........... | 477/41 |
| 6,217,473 | B1* | 4/2001 | Ueda et al. ................... | 475/216 |
| 6,328,669 | B1* | 12/2001 | Imanishi et al. .............. | 476/72 |
| 6,902,510 | B2* | 6/2005 | Imanishi ........................ | 476/42 |
| 7,077,023 | B2* | 7/2006 | Mori et al. .................... | 74/46 |
| 8,038,569 | B2* | 10/2011 | Yokouchi et al. ............ | 475/327 |
| 8,167,760 | B2* | 5/2012 | Nishii et al. ................... | 475/214 |
| 8,257,217 | B2* | 9/2012 | Hoffman ....................... | 475/216 |
| 2002/0111247 | A1* | 8/2002 | Mori et al. ..................... | 476/46 |
| 2003/0104898 | A1* | 6/2003 | Mori .............................. | 476/46 |
| 2009/0318260 | A1* | 12/2009 | Nishii et al. ................... | 476/40 |

FOREIGN PATENT DOCUMENTS

| | | |
|---|---|---|
| CN | 102146997 A | 8/2011 |
| CN | 102192277 A | 9/2011 |

* cited by examiner

*Primary Examiner* — David M Fenstermacher
*Assistant Examiner* — Zakaria Elahmadi

(57) ABSTRACT

A variator assembly for a CVT or an IVT includes an input shaft that defines an axis of rotation, an input disc rotationally coupled to the input shaft and coaxial with the axis of rotation, and an output disc rotationally coupled to the input disc and coaxial with the axis of rotation. The output disc includes a distal portion having an axial width. A gear is connected to the distal portion of the output disc. The gear has a plurality of gear teeth each having a gear tooth face width that is greater than the axial width of the distal portion of the output disc.

17 Claims, 3 Drawing Sheets

VARIATOR OUTPUT GEARSET

FIELD

The present disclosure relates to a variator output gearset for an infinitely variable transmission or a continuously variable transmission.

BACKGROUND

The statements in this section merely provide background information related to the present disclosure and may or may not constitute prior art.

A continuously variable transmission ("CVT") typically includes gearing that operatively couples a variator between a rotary power source, such as an engine or electric motor, and a final drive unit. The variator includes a rotary input disk and a rotary output disk which are able to steplessly or continuously vary the ratio of an input speed to an output speed (the "variator ratio"). The overall speed ratio provided by the CVT is a function of the variator ratio and the associated gearing. The output disc includes integrally formed gear teeth that are in mesh with and drive a corresponding gear. The gear in turn is functionally coupled to an output shaft or layshaft that is functionally coupled to the final drive unit. Another type of stepless transmission includes the infinitely variable transmission (IVT). The IVT is similar to the CVT in that an engine drives the variator input discs while a layshaft takes the drive from the variator via a metal belt or gears. However, while a typical CVT includes a starting device such as a launch clutch, a typical IVT uses a gear system to provide launch from rest.

CVT and IVT designs are optimized to minimize axial length and mass. Accordingly, the gearing on the output disc of the variator has minimized gear teeth face width in order to minimize the axial length of the CVT/IVT. In addition, this gearing is often designed with a low helix angle in order to minimize variator thrust loads and thus enable small bearings and provide a more compact variator system. The combination of narrow face width and low helix angle may lead to the gear pair to have an insufficient contact ratio. This in turn places the gear pair at a higher risk for noise and strength concerns.

One solution to the above problems is to increase the width of the variator disk (i.e. the gear width). However, this will increase the variator axial length, mass, and may require the variator radius to increase as well. Another solution is to increasing the helix angle of the gear teeth on the variator disc. However, this will increase the thrust load thus requiring more axial length due to the need for stronger bearing support.

Therefore, there is a need in the art for a variator output gear set that provides adequate contact ratio while minimizing variator axial length and mass.

SUMMARY

A variator assembly for a CVT or an IVT is provided. The variator assembly includes an input shaft that defines an axis of rotation, an input disc rotationally coupled to the input shaft and coaxial with the axis of rotation, and an output disc rotationally coupled to the input disc and coaxial with the axis of rotation. The output disc includes a distal portion having an axial width. A gear is connected to the distal portion of the output disc. The gear has a plurality of gear teeth each having a gear tooth face width that is greater than the axial width of the distal portion of the output disc.

In one aspect the distal portion is located radially outwardly of the input shaft.

In another aspect the gear is removably connected to the output disc.

In yet another aspect the gear includes a disc portion and an annulus connected to the disc portion that is extended radially inwardly from the disc portion.

In yet another aspect the plurality of gear teeth are disposed on an outer radial surface of the gear.

In yet another aspect the output disc is rotationally coupled to the input disc via a plurality of rollers.

In yet another aspect the gear is attached to the output disc by at least one bolt.

In yet another aspect the gear is attached to the output disc by at least one screw.

In yet another aspect the gear is attached to the output disc by at least one weld.

In yet another aspect the gear is attached to the output disc by at least one screw and at least one weld.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
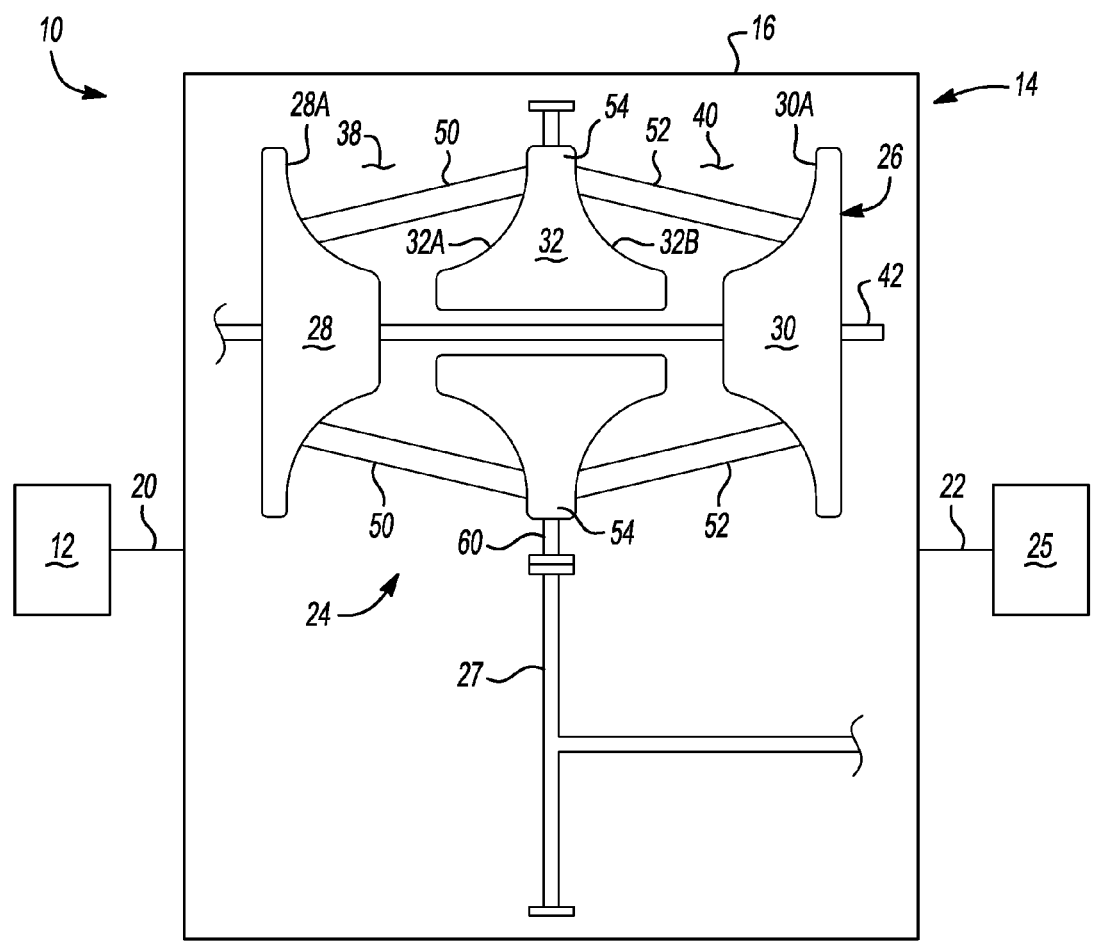
FIG. 1 is a schematic diagram of an exemplary powertrain for a motor vehicle according to the principles of the present invention.

With reference to FIG. 1, a powertrain for a motor vehicle is generally indicated by reference number 10. The powertrain 10 generally includes an engine 12 interconnected with a transmission 14. The engine 12 may be a conventional internal combustion engine or an electric motor, or any other type of prime mover, without departing from the scope of the present disclosure. The engine 12 supplies a driving torque to the transmission 14 through, for example, a flexplate (not shown) or other connecting device or a starting device (not shown) such as a hydrodynamic device or launch clutch.

The transmission 14 is a toroidal-type infinitely variable transmission (IVT) or a toroidal-type continuously variable transmission (CVT). The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft 20 and a transmission output shaft 22. Connected between the transmission input shaft 20 and the transmission output shaft 22 is a gearbox 24 configured to provide forward and reverse speed or gear ratios between the transmission input shaft 20 and the transmission output shaft 22. The transmission input shaft 20 is functionally interconnected with the engine 12 and receives input torque or power from the engine 12. The transmission output shaft 22 is preferably connected with a final drive unit 25 which includes, for example, a propshaft, a differential assembly, and drive axles connected to wheels, etc. The transmission input shaft 20 is coupled to and provides drive torque to the gearbox 24.

The gearbox 24 generally includes one or more toroidal variators, gear sets, clutches and/or brakes, and shafts. For example, the gearbox 24 includes a variator 26 interconnected with a gear 27. The variator 26 is illustrated as a toroidal race rolling type variator. However, it should be appreciated that various other types of variators may be employed without departing from the scope of the present invention. The variator 26 includes a first input disc 28 and a second input disc 30. The first input disk 28 includes a toroidal outer surface or first input race 28A and the second input disk 30 includes a toroidal outer surface or second input race 30A. Disposed between the first and second input races 28A, 30A is an output disk 32. The output disk 32 includes a toroidal outer surface or first output race 32A and a toroidal outer surface or second output race 32B. The first output race 32A is disposed opposite the first input race 28A and the second output race 32B is disposed opposite the second input race 30A. The first input race 28A and the first output race 32A cooperate to define a first toroidal cavity 38 and the second input race 30A and the second output race 32B cooperate to define a second toroidal cavity 40. Each of the disks 28, 30, and 32 share a common rotational axis defined by a variator shaft 42. The variator shaft 42 is functionally interconnected to the transmission input shaft 20 and therefore receives drive torque from the engine 12. The input disks 28 and 30 are rotationally coupled to the variator shaft 42 and transfer drive torque to the output disk 32 via a plurality of rollers 50 and 52.

For example, the first cavity 38 includes the plurality of rollers 50 and second cavity 40 includes the plurality of rollers 52. Typically each of the first and second cavities 38 and 40 include two or three rollers 50 and 52, though it should be appreciated that any number of rollers may be employed without departing from the scope of the present invention. Each of the rollers 50, 52 are mounted for rotation about a roller axis and rolls upon the toroidal races 28A, 32A, 32B, and 30A of its associated input and output disks 28, 30, and 32 to transfer drive from the input disks 28 and 30 to the output disks 32. Changes in variator drive ratio are achieved by precession of the rollers 50, 52 such that the roller's axis is able to turn to change the inclination of the roller axis to the variator axis. Precession of the rollers 50, 52 results in changes of the radii of the paths traced upon the races 28A, 32A, 32B, and 30A by the rollers 50, 52 and hence result in a change of variator drive ratio between the input disks 28 and 30 and the output disk 32.

The output disk 32 includes a central, radially distal portion 54 disposed between the races 32A and 32B. A variator output gear 60 is coupled to the distal portion 54. The variator output gear 60 is intermeshed with the gear 27. The gear 27 is functionally interconnected with the transmission output shaft 22 and supplies drive torque from the variator 26 and variator output gear 60 to the transmission output shaft 22 and therefore the final drive unit 25.

Figure 2:
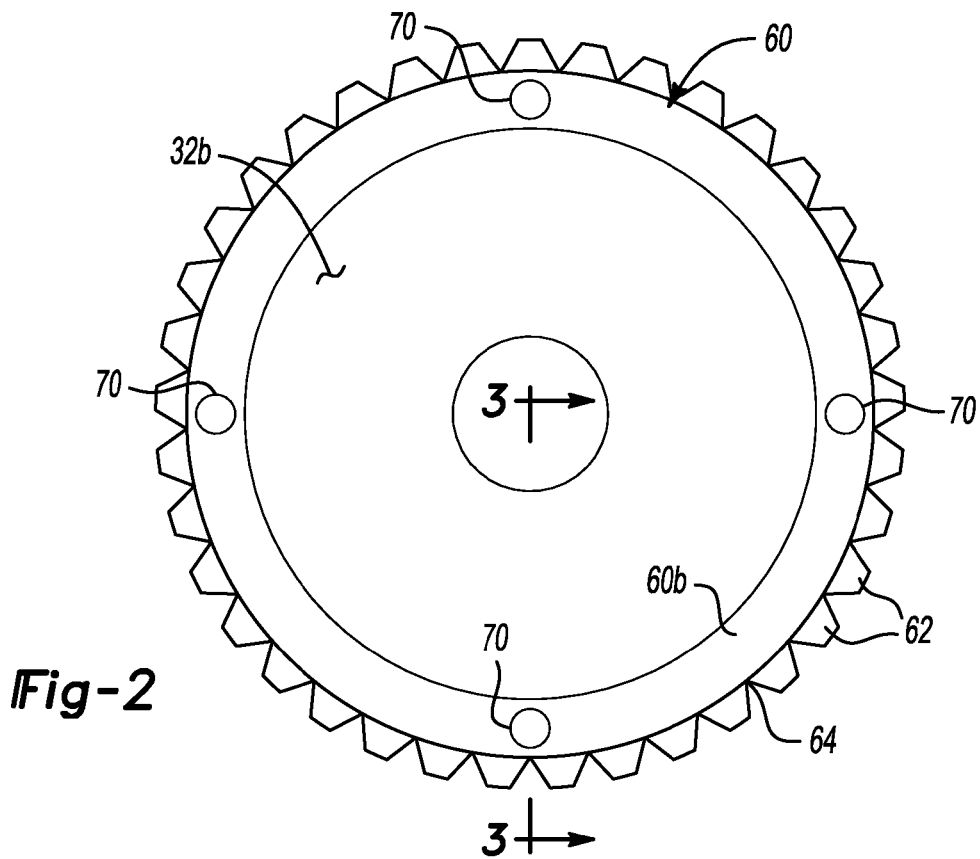
FIG. 2 is an end view of a output disc of a variator and variator output gear according to the principles of the present invention.
Figure 3:
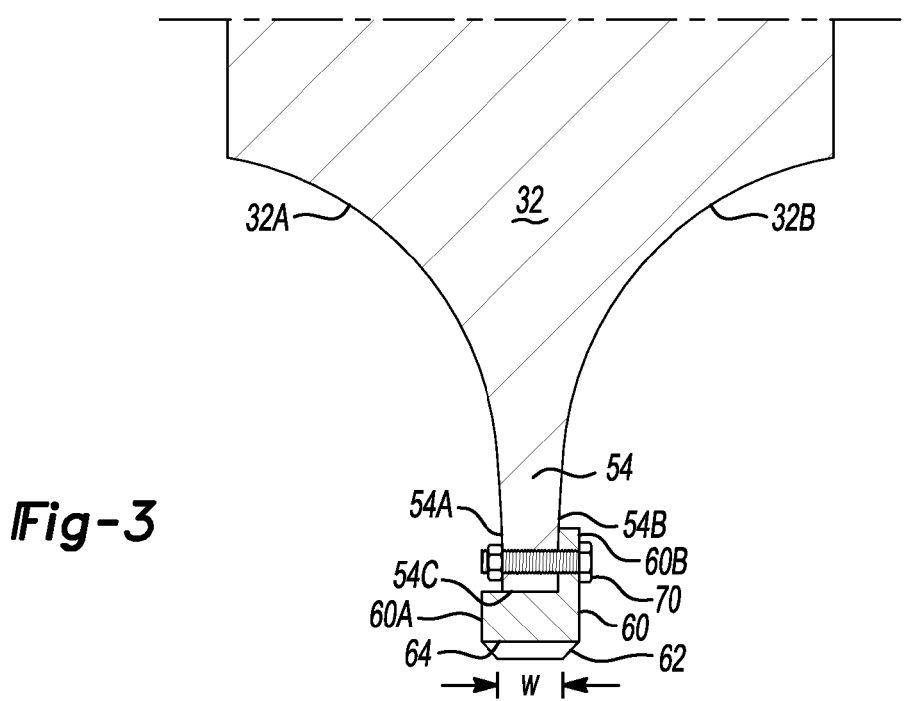
FIG. 3 is a cross-section view of the output disc and variator output gear viewed in the direction of arrows 3-3 in FIG. 2.

With reference to FIGS. 2 and 3, the variator output gear 60 is substantially "L" shaped with a disk portion 60A having a radially inwardly extending annulus 60B. A plurality of gear teeth 62 are formed by various manufacturing processes along an outer circumferential surface 64 of the disk portion 60A. The gear teeth 62 are configured to intermesh with the gear 27.

The variator output gear 60 may be rotationally coupled to the distal portion 54 in various configurations. For example, the distal portion 54 of the output disk 32 includes a first side 54A, a second side 54B, and an outer circumferential end surface 54C. In one example, the annulus 60B is in contact with the second side 54B and a plurality of axial bolts 70 couple the annulus 60B to the distal portion 54. The disk portion 60A has an inner diameter approximately equal to the diameter of the outer circumferential end surface 54C of the distal portion 54. However, the disk portion 60A has a width greater than a width of the distal portion 54. Accordingly, the gear teeth 62 have a gear face width "w" greater than the width of the distal end 54. The larger gear face width increases the contact ratio and strength between the variator output gear 60 and the gear 27 without impacting the radial or axial length of the output disk 32 of the variator 26.

In addition, the separated variator output gear 60 allows the variator output gear 60 and the output disk 32 to be manufactured and heat treated using different materials and processes in order to optimize their individual performance characteristics. Also, using a separate variator output gear 60 allows different output gears to be connected to the output disk 32 without changing the output disk 32, thereby allowing for greater gear ratio flexibility for a given application. Finally, it should be appreciated that while the output gear 60 has been described coupled to the output disk 32, the present invention contemplates that the output gear 60 may be an input gear and may be coupled to any of the disks of the variator 26.

Figure 4A:
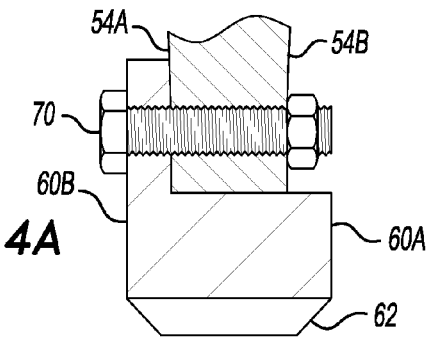
FIG. 4A is a cross-section view of an alternate configuration for attaching the variator output gear to the output disc.

FIG. 4A illustrates an alternate configuration for attaching the variator output gear 60 to the output disk 32. In this configuration, the annulus 60B is in contact with the first side 54A of the distal portion 54 and the plurality of axial bolts 70 couple the annulus 60B to the distal portion 54.

Figure 4B:
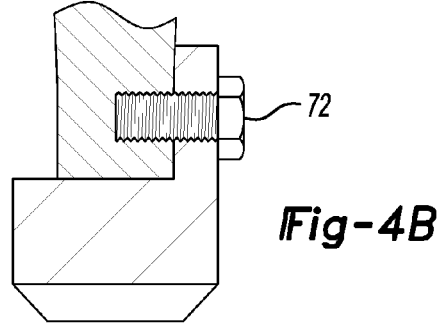
FIG. 4B is a cross-section view of an alternate configuration for attaching the variator output gear to the output disc.

FIG. 4B illustrates yet an alternate configuration for attaching the variator output gear 60 to the output disk 32. In this configuration, the annulus 60B is in contact with the second side 54B of the distal portion 54 and the annulus 60B is coupled to the distal portion 54 via a plurality of screws or rivets 72.

Figure 4C:
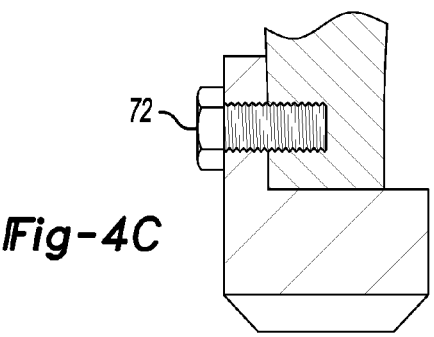
FIG. 4C is a cross-section view of an alternate configuration for attaching the variator output gear to the output disc.

FIG. 4C illustrates yet an alternate configuration for attaching the variator output gear 60 to the output disk 32. In this configuration, the annulus 60B is in contact with the first side 54A of the distal portion 54 and the annulus 60B is coupled to the distal portion 54 via the plurality of screws or rivets 72.

Figure 4D:
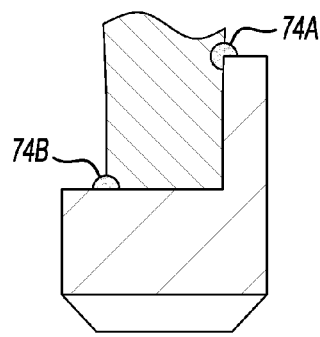
FIG. 4D is a cross-section view of an alternate configuration for attaching the variator output gear to the output disc.

FIG. 4D illustrates yet an alternate configuration for attaching the variator output gear 60 to the output disk 32. In this configuration, the annulus 60B is in contact with the second side 54B of the distal portion 54. A first weld 74A secures the annulus 60B to the second side 54B while a second weld 74B secures the inner annular surface of the disk portion 60A to the first side 54A.

Figure 4E:
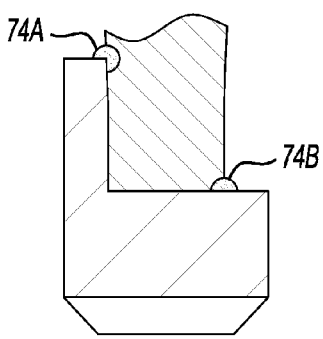
FIG. 4E is a cross-section view of an alternate configuration for attaching the variator output gear to the output disc.

FIG. 4E illustrates yet an alternate configuration for attaching the variator output gear 60 to the output disk 32. In this configuration, the annulus 60B is in contact with the first side 54A of the distal portion 54. The first weld 74A secures the annulus 60B to the first side 54A while the second weld 74B secures the inner annular surface of the disk portion 60A to the second side 54B.

Figure 4F:
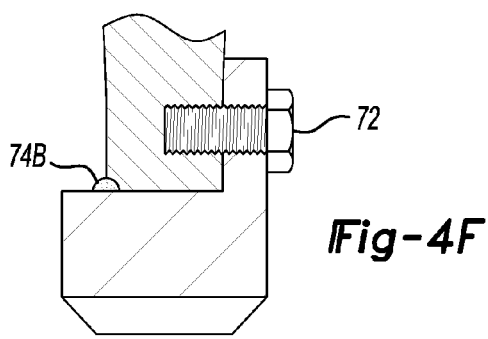
FIG. 4F is a cross-section view of an alternate configuration for attaching the variator output gear to the output disc.

FIG. 4F illustrates yet an alternate configuration for attaching the variator output gear 60 to the output disk 32. In this configuration, the annulus 60B is in contact with the second side 54B of the distal portion 54. A plurality of screws or rivets 72 secures the annulus 60B to the second side 54B while the second weld 74B secures the inner annular surface of the disk portion 60A to the first side 54A.

Figure 4G:
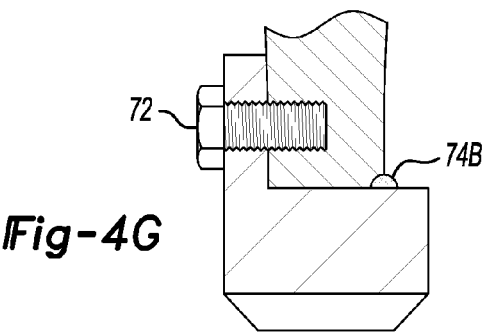
FIG. 4G is a cross-section view of an alternate configuration for attaching the variator output gear to the output disc.

FIG. 4G illustrates yet an alternate configuration for attaching the variator output gear 60 to the output disk 32. In this configuration, the annulus 60B is in contact with the first side 54A of the distal portion 54. A plurality of screws or rivets 72 secures the annulus 60B to the first side 54A while the second weld 74B secures the inner annular surface of the disk portion 60A to the second side 54B.

Figure 4H:
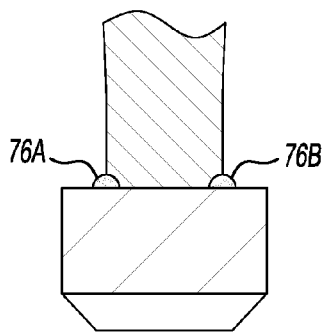
FIG. 4H is a cross-section view of an alternate configuration for attaching the variator output gear to the output disc.

FIG. 4H illustrates yet an alternate configuration for attaching the variator output gear 60 to the output disk 32. In this configuration, variator output gear 60 does not include the annulus 60B. A first weld 76A secures the inner annular surface of the disk portion 60A to the first side 54A while a second weld 76B secures the inner annular surface of the disk portion 60A to the second side 54B.

The description of the invention is merely exemplary in nature and variations that do not depart from the gist of the invention are intended to be within the scope of the invention. Such variations are not to be regarded as a departure from the spirit and scope of the invention.

The invention claimed is:

1. A variator assembly for a transmission comprising:
an input shaft that defines an axis of rotation;
an input disc rotationally coupled to the input shaft and coaxial with the axis of rotation;
an output disc rotationally coupled to the input disc and coaxial with the axis of rotation, wherein the output disc has a first side surface that transitions smoothly to a first race and a second side surface that transitions smoothly to a second race and has a distal end portion having an axial width; and
a gear connected to the distal end portion of the output disc, wherein the gear includes a disc portion and an annulus connected to the disc portion that is extended radially inwardly from the disc portion and is in contact with the first side surface of the output disc, and wherein the gear has a plurality of gear teeth each having a gear tooth face width greater than the axial width of the distal end portion of the output disc.

2. The variator assembly of claim 1 wherein the distal end portion is located radially outwardly of the input shaft.

3. The variator assembly of claim 1 wherein the gear is removably connected to the output disc.

4. The variator assembly of claim 1 wherein the plurality of gear teeth are disposed on an outer radial surface of the gear.

5. The variator assembly of claim 1 wherein the output disc is rotationally coupled to the input disc via a plurality of rollers.

6. The variator assembly of claim 1 wherein the gear is attached to the output disc by at least one bolt through the annulus.

7. The variator assembly of claim 1 wherein the gear is attached to the output disc by at least one screw or rivet through the annulus.

8. The variator assembly of claim 1 wherein the gear is attached to the output disc by at least one weld.

9. The variator assembly of claim 1 wherein the gear is attached to the output disc by at least one screw and at least one weld.

10. A transmission comprising:
an input shaft;
an output shaft;
a variator shaft operatively associated with the input shaft;
a variator having a first input disc and a second input disc each rotationally coupled to the variator shaft and an output disc disposed between the first and second input discs and rotationally coupled to the first and second input discs, wherein the output disc includes a first side surface that transitions to a first race and a second side surface that transitions to a second race and includes a distal end portion having a width defined in an axial direction;
a drive gear connected to the distal end portion of the output disc, wherein the gear includes a disc portion and an annulus connected to the disc portion that is extended radially inwardly from the disc portion and is in contact with the first side surface of the output disc, and wherein the drive gear has an axial width greater than an axial width of the distal end portion of the output disc; and
a driven gear intermeshed with the drive gear and operatively associated with the output shaft.

11. The transmission of claim 10 wherein the distal end portion is disposed axially between the first and second input discs.

12. The transmission of claim 10 wherein the distal end portion is distal relative to the axis of rotation of the output disc.

13. The transmission of claim 10 wherein the drive gear has a plurality of gear teeth each having a gear tooth face width greater than an axial width of the distal end portion of the output disc.

14. The transmission of claim 10 wherein the gear is removably connected to the output disc.

15. The transmission of claim 10 wherein the annulus is attached to the first side surface of the output disc.

16. The transmission of claim 15 wherein the annulus is attached to the first side surface of the output disc via at least one of a bolt, a screw, and a weld.

17. A transmission comprising:
an input shaft;
an output shaft;
a variator shaft operatively associated with the input shaft;
a variator having a first input disc and a second input disc each rotationally coupled to the variator shaft and an output disc disposed between the first and second input discs and rotationally coupled to the first and second input discs, wherein the output disc includes a first side that transitions smoothly to a first race, a second side that transitions smoothly to a second race, and an outer circumferential end surface extended from the first side to the second side, wherein the outer circumferential end surface has a width defined in an axial direction from the first side to the second side and wherein the outer circumferential end surface has a constant radius from the first side to the second side;

a drive gear connected to the output disc at the outer circumferential end surface, wherein the drive gear is axially centered on the outer circumferential end surface and has an axial width greater than the axial width of the outer circumferential end surface; and a driven gear intermeshed with the drive gear and operatively associated with the output shaft.

* * * * *